United States Patent

[11] 3,593,813

| [72] | Inventors | Shigeru Kitaba;<br>Shigeru Matsui; Kiyoaki Nakahara, all of Kyoto-shi, Japan |
|---|---|---|
| [21] | Appl. No. | 787,429 |
| [22] | Filed | Dec. 27, 1968 |
| [45] | Patented | July 20, 1971 |
| [73] | Assignee | Kabushiki Kaisha Ishada Koki Seisakusyo Kyoto-shi, Japan |
| [32] | Priority | May 24, 1968, Sept. 11, 1968, Oct. 4, 1968 |
| [33] | | Japan |
| [31] | | 43/35410, 43/65733 and 43/72634 |

[54] AUTOMATIC WEIGHING APPARATUS
12 Claims, 12 Drawing Figs.

[52] U.S. Cl. .................................................. 177/82,
177/105
[51] Int. Cl. ........................................... G01g 13/04
[50] Field of Search ........................................ 177/50, 82,
105, 119, 120, 121, 122

[56] References Cited

UNITED STATES PATENTS

| 2,701,703 | 2/1955 | Evers ...................... | 177/121 |
| 2,976,006 | 3/1961 | Stambera ................ | 177/119 X |
| 3,117,639 | 1/1964 | Dreeben .................. | 177/122 X |
| 3,135,343 | 6/1964 | Stambera ................ | 177/122 X |
| 3,175,632 | 3/1965 | Rouban ................... | 177/120 X |

FOREIGN PATENTS

| 1,319,343 | 1/1963 | France ..................... | 177/120 |
| 813,316 | 7/1951 | Germany .................. | 177/82 |

*Primary Examiner*—Richard B. Wilkinson
*Assistant Examiner*—George H. Miller, Jr.
*Attorney*—Hall & Houghton

ABSTRACT: An apparatus for automatically weighing out material in desired weight quantities by roughly weighing a portion, gauging it for its weight relation to the desired quantity and adding or subtracting material if necessary to achieve the desired quantity.

PATENTED JUL 20 1971

SHIGERU KITABA,
SHIGERU MATSUI,
KIYOAKI NAKAHARA,

INVENTORS

BY  Hall & Houghton

ATTORNEY

FIG. 4.

SHIGERU KITABA,
SHIGERU MATSUI,
KIYOAKI NAKAHARA,
INVENTORS

By Hall & Hughes
ATTORNEY

SHIGERU KITABA,
SHIGERU MATSUI,
KIYOAKI NAKAHARA,
INVENTORS

AUTOMATIC WEIGHING APPARATUS

The present invention relates to an automatic weighing apparatus for slender barlike pieces such as spaghetti and macaroni.

In the case of weighing out barlike pieces such as macaroni, efficient and accurate weighing can be achieved if a weighing system is employed wherein a quantity approximating the ultimate value is first roughly weighed out and then the excess or deficiency of this rough quantity is gauged and corrected.

An important object of the invention is to provide an automatic weighing apparatus capable of roughly weighing out a quantity approximating the ultimate value and then gauging and correcting the excess or deficiency of this rough quantity, wherein when once barlike pieces are continuously or intermittently fed to a first feed hopper, the subsequent rough weighing, gauging and correction of the excess or deficiency are successively automatically effected, thereby taking out the predetermined ultimate successive quantities with high accuracy.

Another object is to provide rough-weighing means which is rational wherein barlike pieces are fed in large quantities to a rough-weighing hopper from two ports one in a first trough and the other in a lower trough therebelow, and when the first hopper is changed from a strong vibration state for large quantity supply to a weak vibration state for small quantity supply and at the same time the port of the first trough is closed, small quantities are henceforth supplied solely from the lower trough, during which barlike pieces are reserved in the front end portion of the first trough, until the subsequent weighing operation begins, whereupon the first trough is opened and the vibrations for supply purposes change from weak to strong ones to resume large quantity supply, whereupon the barlike pieces reserved in the front end portion of the first trough during the small quantity supply are fed in large quantities into the rough-weighing hopper at a time, thereby effecting rough-weighing operation efficiently accurately.

Another object is to provide gauging means whereby upon receipt of roughly weighed barlike pieces they are accurately gauged, wherein in the case of an excessive quantity, surplus reduction means is actuated and in the case of a deficient quantity, precision corrector means is actuated and in the case of the desired ultimate valve, a gauger hopper, a surplus reduction hopper and a precise correction supply-weighing hopper are successively opened to take out the barlike pieces.

Another object is to provide surplus reduction means whereby when gauged barlike pieces after gauging operation are found to be excessive, part of them are removed in such a manner as to cause the remainder to become a minus quantity, that is, to allow a precise correction to be made, wherein by means of buckets on a rotary drum opposed to a notched window in one lateral surface of a hopper, barlike pieces supplied to said hopper are taken up in successive fixed quantities, at the time of which taking up a control plate within said opening is slightly rotated to take up a fixed quantity to level above the rest of the barlike pieces to facilitate the taking up by buckets, and after said fixed quantity is taken up by the bucket, a corresponding pawl is caused to project to the inlet of the bucket by the rotation of the rotary drum and by the action of a fixed cam, lever, etc., thereby keeping the taken up pieces from spilling until they reach the place of ejection.

Another object is to provide precision correction means whereby when a rough quantity is found to be a minus quantity or is so operated as to have a minus quantity, barlike pieces are taken out of a second trough in very small successive quantities to be fed on to the weighing hopper in which said minus rough quantity has been contained, until the ultimate value is reached, wherein barlike pieces are supplied by the second trough to the peripheral surface of a rotary drum where they are successively received in small quantities in recesses on the peripheral surface of the rotary drum and are brought above the weighing hopper by the rotation of the rotary drum, during which rotation a pawl is operated by the rotation of the drum and the action of a fixed cam, lever, etc. to keep the barlike pieces from spilling in the course of transfer.

Another object is to provide vertical multistep supply hopper means capable of separately supplying barlike pieces to the first trough of the rough-weighing means and to the second trough of the precision correction means, wherein when barlike pieces are fed to a first supply hopper, they are divergently flown to the inlet of the first trough and the inlet of the second supply hopper affixed thereto by means of a resistance plate in the lower portion of the first supply hopper, so that the feeding operation of barlike pieces for the second trough is omitted.

With these and other objects in view, the invention comprises certain types of structures to be hereinafter described and pointed out in the appended Claims Preferred embodiments of the invention are shown in the accompanying drawings, in which:

Figure 1:
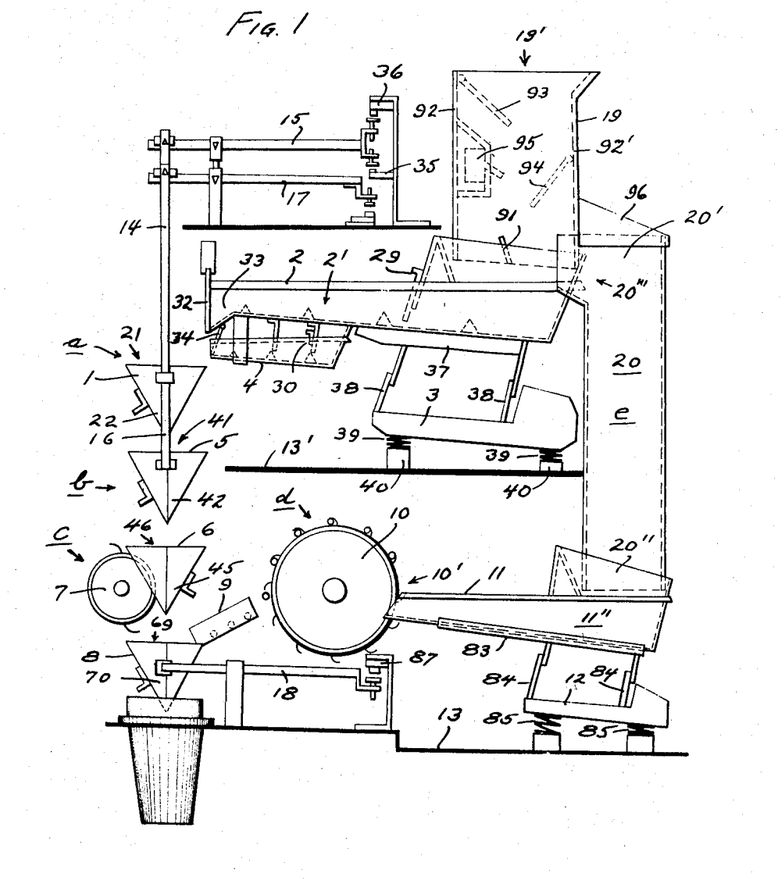
FIG. 1 is a side elevational view of an entire automatic weighing apparatus.

Referring to the drawings, in FIG. 1, $a$ denotes rough-weighing means; $b$, gauging means; $c$, surplus reduction means; $d$, precision correction means; and $e$, vertical multistep supply hopper means. The rough-weighing means $a$ comprises of a rough-weighing hopper 1, a first trough 2, a first electromagnetic feeder 3, and a lower trough 4. The gauging means $b$ comprises a gauging hopper 5. The surplus reduction means $c$ comprises a surplus reduction hopper 6 and a surplus reduction rotary drum 7. The precision correction means $d$ comprises a precision correction supply weighing hopper 8, an introducing chute 9, a rotary drum 10, a second trough 11 and a second electromagnetic feeder 12. The hoppers 1, 5, 6 and 8 are successively vertically disposed at predetermined spaced intervals in suspended relation toward a floor 13. The rough-weighing hopper 1 is suspended from a main lever 15 by a suspender rod 14 and the gauging hopper 5 is suspended from a gauging lever 17 by a suspender rod 16. The surplus reduction hopper 6 is suitably fixed in position and the precision correction supply weighing hopper 8 is suspended from a lever 18. The first and second troughs 2 and 11 are disposed in two vertical steps on the same side with respect to their respective hoppers 1 and 8 and are interconnected by the vertical multistep supply hopper means $e$. The vertical multistep supply hopper means $e$ comprises a first supply hopper 19 and a second supply hopper 20.

The above is the overall arrangement of the present automatic weighing apparatus. The means $a$, $b$, $c$, $d$ and $e$ will now be described in order.

Figures 2, 3:
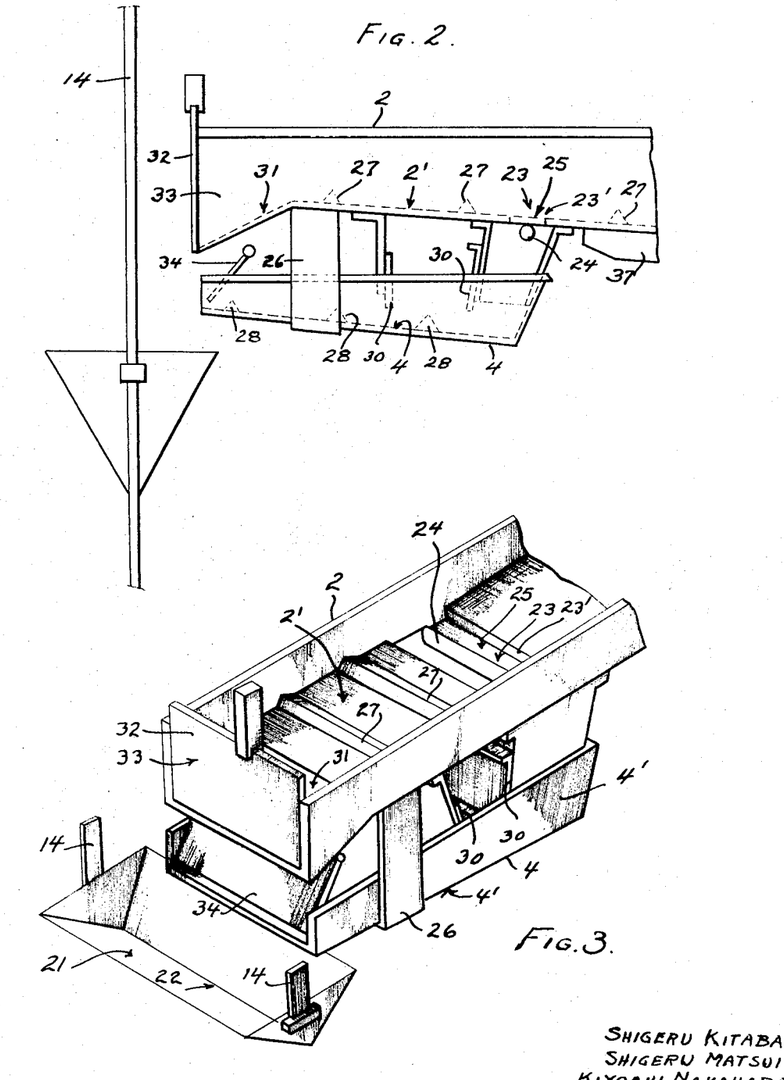
FIG. 2 is an enlarged side elevational view of rough-weighing means shown in FIG. 1.
FIG. 3 is a perspective view of the rough-weighing means shown in FIG. 2.

As shown in FIGS. 1—3, the rough-weighing means a is constituted by the rough-weighing hopper 1 capable of horizontally receiving a large number of slender barlike pieces, the first trough 2 having a supply passage of substantially the same width as said rough-weighing hopper, the first electromagnetic feeder 3 capable of changing the supply purpose vibration of the first trough 2 in two stages one for strong vibration for large quantity supply and the other for weak vibration for small quantity supply, the lower trough 4 for receiving the supply of barlike pieces from somewhere between the ends of the first trough and supplying them in small quantities. As shown in FIG. 1, the rough-weighing hopper 1 is provided at its upper surface with a receiving port 21 and is adapted to be free to open and close at its bottom 22. The lower trough 4 extends from the middle to the front end of the first trough 2 along the lower surface thereof, its passage width being equal to the passage width of the first trough slightly larger than the length of barlike pieces.

Somewhere between the ends of the bottom plate 2' of the first trough 2, there is formed an inlet port 23 for barlike pieces positioned above the receiving portion 4'' of the lower trough 4. A guide roller 24 is rotatably supported in the inlet port 23 to define an open clearance 25 between the roller and the edge 23' through which a predetermined number of barlike pieces can be passed at a time. Support plates 26 are suspended on both sides of the first trough 2 and support the opposed lateral plates of the lower trough 4.

The first and lower troughs 2 and 4 are vibrated by the first electromagnetic feeder 3 shown in FIG. 1 which produces vibrations. The bottom plates 2' and 4' of the first and lower troughs 2 and 4, respectively, have their respective parallelism correction plates 27 and 28 of triangular cross section fixed thereto at suitable spaced intervals and extending at right angles with the direction of travel of the barlike pieces. Flow regulator plates 29 and 30 are provided on the front side of the receiving portions 2'' and 4'' of the first and lower troughs 1 and 2 in such a manner as to be capable of adjusting the height thereof so that the clearance between the bottom plates 2' and 4' can be regulated. The bottom plates 2' and 4' of the first and lower troughs 2 and 4 somewhat slope upwardly with respect to the ground in order to assure smooth transfer of barlike pieces thereon by supply purpose vibration. The front end portion of the bottom plate 2' of the first trough 2 is bent at 31 to provide a downward slope so that when a large quantity shutter 32 is closed an accumulation pocket 33 may be formed at said portion. While the bottom plate 4' of the lower trough 4 is inclined with an upward slope in substantially the same manner as the bottom plate 2' of the first trough, the front end portion thereof is not bent but is left intact and a weighing completion shutter 34 is provided at said portion.

The front ends of the first and lower troughs are aligned with each other and look toward a place above the rough-weighing trough 1. The large quantity shutter 32 and the weighing completion shutter 34 are actuated to be opened and closed at the predetermined time to be later described by means of a large quantity supply contactless proximity switch 35 and a small quantity supply contactless proximity switch 36 positioned adjacent the lever 15.

The first trough 2 is supported by the first electromagnetic feeder 3 through a base frame 37 and elastic plates 38. The first electromagnetic feeder 3 is so adapted as to change the supply purpose vibration amplitude from one for strong vibration for large quantity supply to one for weak vibration for small quantity supply at the time to be later described. The first electromagnetic feeder 3 is installed on a floor surface 13' through springs 39 and installation blocks 40.

The gauging means b is constituted by the gauging hopper 5, etc., as shown in FIG. 1, said gauging hopper being capable of being charged with roughly weighed barlike pieces in large quantities at a time. The gauging hopper 5 has a receiving port 41 disposed immediately below the rough-weighing hopper with a predetermined distance therebetween, and a bottom 42 adapted to be free to open and close. The gauging hopper 5 is suspended from the gauging lever 17 installed thereabove by the suspender rod 16. The gauging lever 17 is provided with a contactless proximity switch 43, etc., and in accordance with the actuation displacement of the gauging lever 17, the subsequent surplus reduction means c and precision correction means d to be later described will be actuated.

Figure 4:
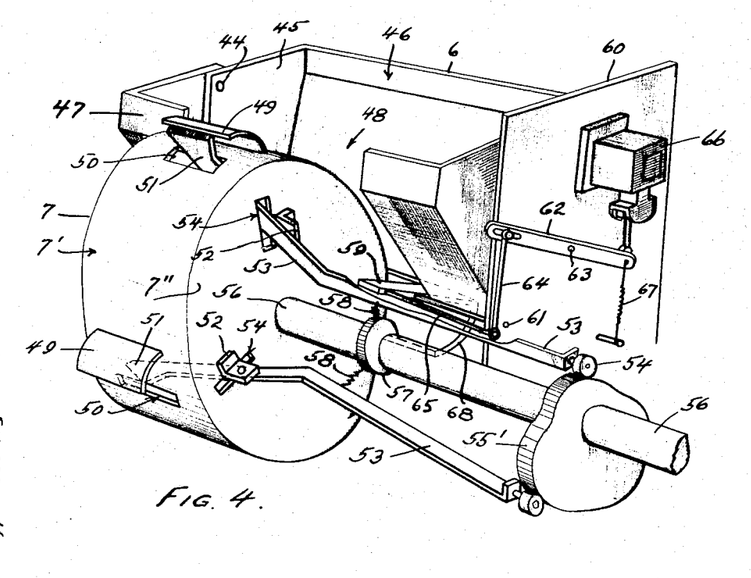
FIG. 4 is a perspective view of surplus reduction means shown in FIG. 1.

The surplus reduction means c, as shown in FIGS. 1 and 4, is constituted by the hopper 6 capable of being charged with gauged barlike pieces in large quantities at a time and the rotary drum 7 capable of removing a predetermined quantity of the barlike pieces in the hopper 6. The hopper 6 is so constructed that a constituent frame plate 45 alone on one side can be opened and closed at the predetermined time turning around axis of a pivot pin 44 so that the hopper is capable of receiving and discharging barlike pieces. The hopper 6 is suspended immediately below the gauging hopper (5) with a predetermined distance therebetween by any suitable means, and has a receiving port 46 opened immediately below the detecting and weighing hopper 5. The constituent frame plate on the fixed side of the hopper 6 parallel to the barlike pieces in the hopper 6 is provided with a notched window 48. Outside the hopper 6, the rotary drum 7 is disposed parallel to the barlike pieces in the hopper 6. Part of the peripheral surface of the rotary drum 7 extends into the hopper 6 through the notched window 48. The outer peripheral surface 7' of the rotary drum 7 is provided with three circumferentially equispaced buckets 49 projecting therefrom and facing in the same direction, whereby the barlike pieces in the hopper 6 can be taken out in a manner to be later described. The regions of the outer peripheral surface of the rotary drum 7 corresponding to the inlets of the buckets 7' are formed with slits 50. Pawls 51 are provided in the rotary drum 7 corresponding to the slits 50. Fastener metal members 52 are rigidly secured to the end surface 7'' of the rotary drum 7 corresponding to the slits 50, and the intermediate portion of a lever 53 is pivotally mounted on each metal member 52, one end of said lever 53 being inserted in the rotary drum through the slit 54, and the pawl 51 is secured to the front end of the lever 53. The levers 53 are disposed parallel to a rotary shaft 56 and the other end of each lever 56 is rotatably provided with a roller 54 extending in the same direction as the rotary shaft 56, said rollers 54 being contacted with the cam surface 55' of a cam plate 55. The cam plate 55 is loosely fitted on the rotary shaft 56 of the rotary drum 7 and suitably fixed in position. A circular plate 57 is rigidly secured to the rotary shaft 56 between the rotary drum 7 and the cam plate and a spring 58 is connected between the circular plate 57 and each lever 53. The springs 58 serve to urge the rollers 54 permanently against the cam plate 55. The rotary drum 7 is fixed to the rotary shaft 56; and when they are rotated, the levers 53 are also rotated and pivoted in accordance with the shape of the cam plate 55, with the pawls going in and out at the slits 50.

Figure 5:
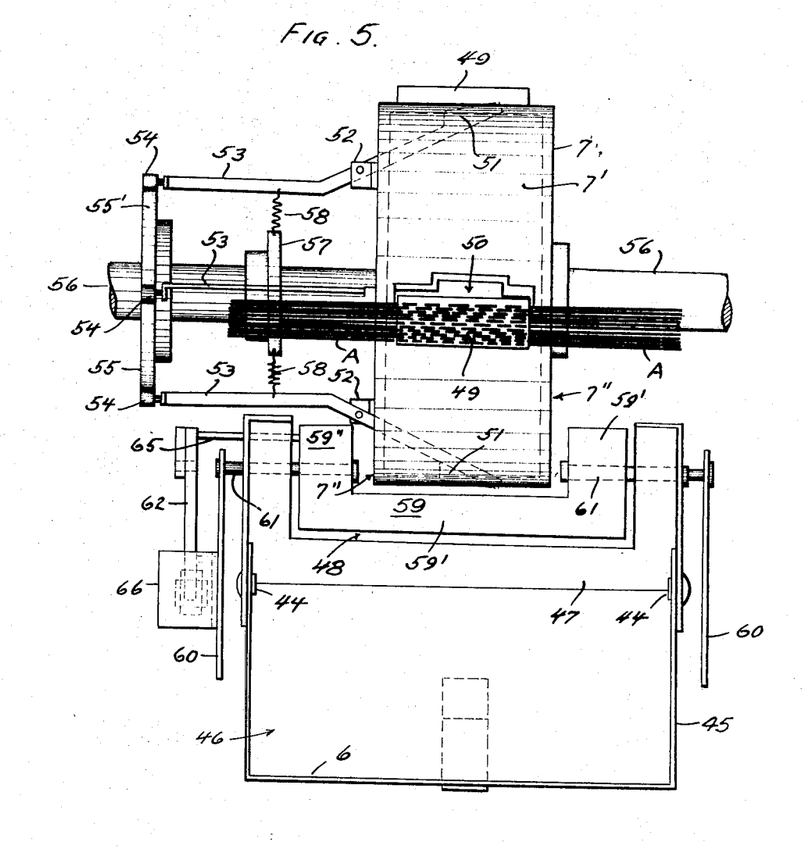
FIG. 5 is a plan view of the surplus reduction means shown in FIG. 4.
Figure 6:
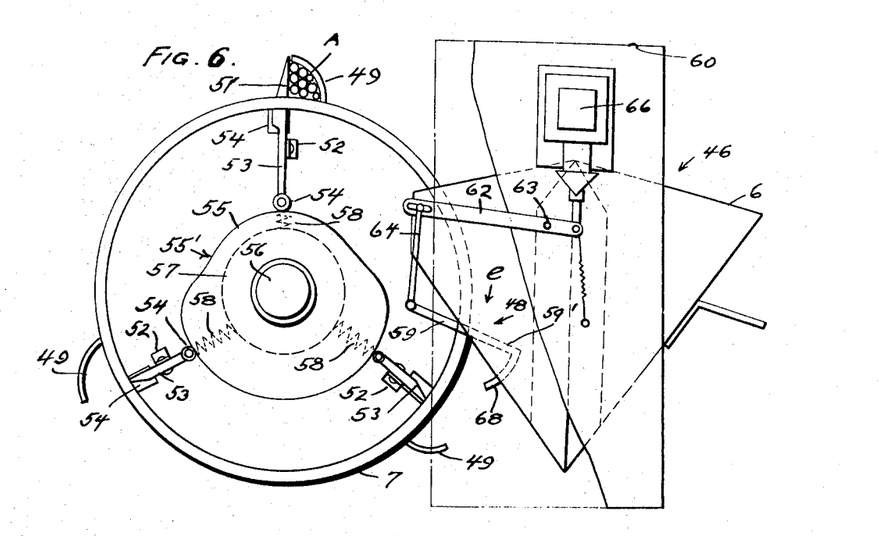
FIG. 6 is a side elevational view of the surplus reduction means shown in FIG. 4, showing a control plate in its position assumed before it takes up barlike pieces.
Figure 7:
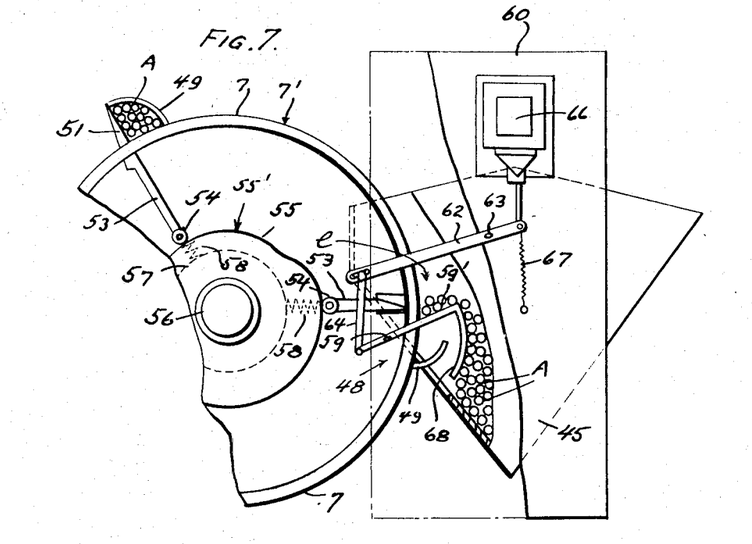
FIG. 7 is a side elevational view of the surplus reduction means shown in FIG. 4, showing a position in which the control plate is taking up barlike pieces.

The time of going in and out of the pawls 51 will be set at the time to be later described in accordance with the shape of the cam plate 55. A control plate 59 is provided in the notched window 49 in the hopper 6. As shown in FIG. 5, the control plate 59 is substantially U-shaped, having an intermediate active plate portion 59' positioned within the hopper 6 and two lateral arm plate portions 59'' extending to the outside of the hopper 6 from between the notched window 48 and the lateral surfaces 7'' of the rotary drum 7. Suitably erected on both sides of the hopper 6 are auxiliary plates 60 on which the lateral arm plate portions 59'' are horizontally pivotally mounted by pivot shafts 61. As shown in FIG. 4, a lever 62 is pivotally mounted on the outer surface of the auxiliary plate 60 by a pivot shaft 63 and the front end of the lever 62 is connected to the projecting end of the lateral arm plate portion 59'' through a vertical rod 64 and a horizontal rod 65. An attraction magnet 66 is provided in the upper region of the outer surface of the auxiliary plate 60 and a spring 67 is provided in the lower region of said surface, and they are connected to the rear end of the lever 62. When the attraction magnet 66 is energized, the lever 62 is turned against the spring 67 from the position shown in FIG. 6 to the one shown in FIG. 7, so that the active plate portion 59' of the control plate 59 is turned with its position changed from downward slope to upward slope with respect to the ground and at the same time a clearance s for the passage of the buckets 49 is formed between the control plate 59 and the rotary drum 7. Conversely, when the attraction magnet 66 is deenergized, the control plate 59 and the associated linkage are returned to the position shown in FIG. 6 by means of the stored energy of the spring 67. Intrusion-preventive plates 68 in an arcuate form agreeing with the arcuate path of the front ends of the active plate portions 59' of the control plate 59 depend from said front ends and are rotatably contacted with the lower edge of the notched window 48. The intrusion-preventive plates 68 are slightly wider than the turning path width of the control plate 59 and are maintained always in contact with the lower edge of the notched window 48. The constituent frame plate 45 of the hopper 6, the rotary drum 7 and the attraction magnet 66 will be actuated in connection with the operation of the gauging lever 17 in a manner to be later described.

Figure 8:
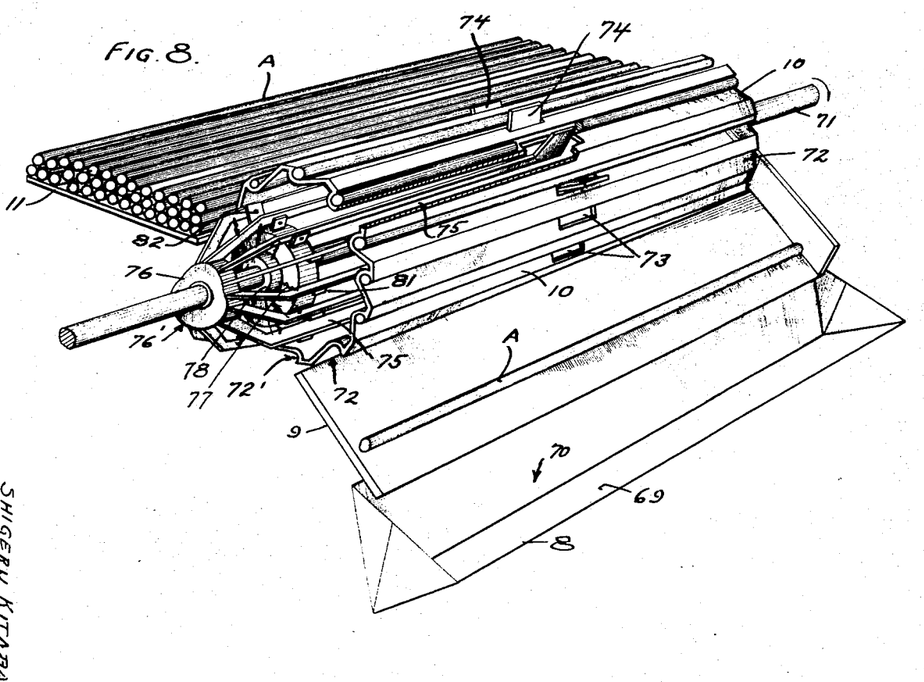
FIG. 8 is a fragmentary perspective view of precision correction means shown in FIG. 1.
Figure 9:
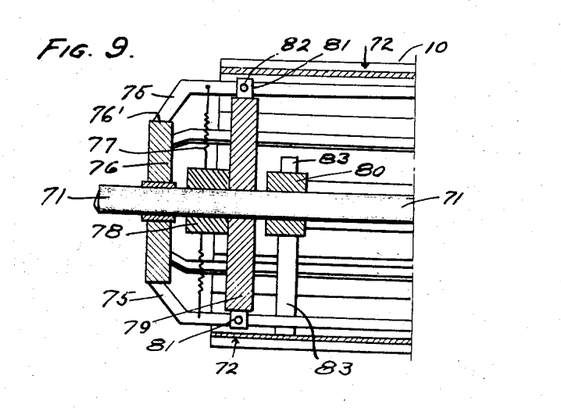
FIG. 9 is a front view, in longitudinal section, of a precision correction supply rotary drum.

The precision correction supply means d, as shown in FIG. 1, is constituted by the weighing hopper 8 capable of horizontally receiving a large number of barlike pieces, the second trough 11 having a supply passage of substantially the same width as the weighing hopper, the second electromagnetic feeder 12, and the rotary drum 10 adapted to receive the supply of barlike pieces from the second trough 11 while picking them up little by little, e.g. one by one, and supply them to the weighing hopper 8 through the chute 9. As shown in FIG. 8, the weighing hopper 8 has a receiving port 69 and a bottom 70 adapted to be free to open and close. The rotary drum 10 is rigidly secured to a rotary shaft 71 suitably journaled horizontally. The outer peripheral surface of the rotary drum 10 is provided with a number of circumferentially equispaced barlike piece-receiving recesses 72 extending axially thereof. Each recess 72 is substantially L-shaped in cross section having a bottom 72' on which one or a predetermined number of barlike pieces A can be received. The recesses 72 are arranged on the outer peripheral surface of the rotary drum 10, opening and facing a fixed direction so that barlike pieces A can be successively received in the recesses 72. The inlet portion of each recess is bored with an opening 73 within which a pawl 74 is provided. A number of levers 75 are provided within the rotary drum in such a manner as to extend parallel to the rotary shaft 71 and the pawl 74 is rigidly secured to the front end of each lever 75. The rear end of each lever 75 is resiliently pressed against the cam surface 76' of a cam plate 76 by means of a spring 77. The cam plate 76 is loosely fitted on the rotary shaft 71 and suitably fixed in position. As shown in FIG. 9, a cylinder 78, a circular plate 80 and a cylinder 81 are fitted on and fixed to the rotary shaft 71. The springs 77 are secured to the cylinder 78 and the intermediate portion of each lever 75 is pivotally mounted on a support 81 on the circular plate 79 by means of a pivot pin 82.

Figure 10:
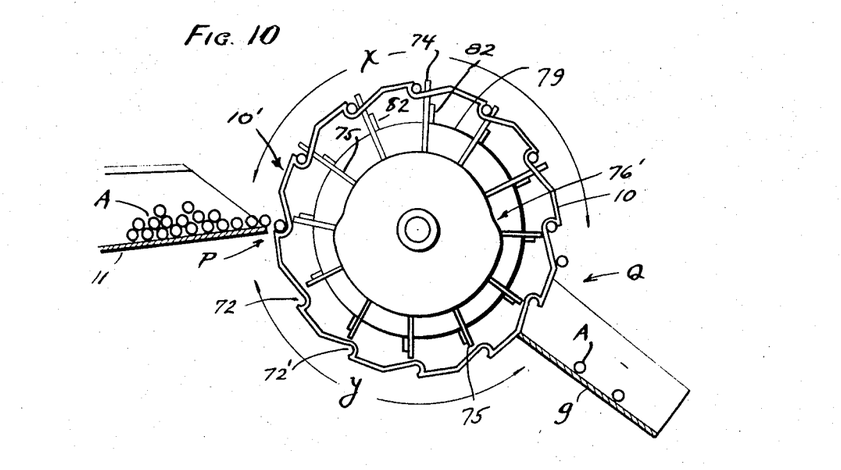
FIG. 10 is a side elevational view of the precision correction supply rotary drum, showing the barlike piece arresting and releasing regions, respectively.

Supports 83 for the rotary drum 10 are provided on the cylinder 80. When the rotary shaft 71 and the rotary drum 10 are unitarily rotated, the rear end of each lever 75 is slidably rotated on the cam surface 76' so that each lever 75 is turned around the axis of the pin 82, and each pawl 74 is projected above the inlet portion of the recess 72 through the opening 73 and then retracted. As shown in FIG. 10, the front end of the second trough 11 is brought into close proximity to the intermediate region of one lateral surface of the rotary drum 10 and the chute 9 is disposed at the lower region of the other lateral surface of the rotary drum 10. The point of approach of the trough 11 is defined as a barlike piece-holding point P and the point of approach of the chute 9 as a barlike piece release point Q. Thus, the circumference of the rotary drum 10 is divided into two arcuate regions by the points P and Q. The upper arcuate region X is referred to as a grip region X, in which the diameter of the cam plate 76 is made small. The lower arcuate region Y is referred to as a release region Y, in which the diameter of the cam plate 76 is made large. When the rotary drum 10 is rotated in a clockwise direction as seen in FIG. 10, the pawls 74, when moving in the grip region X, are projected and, when moving in the release region Y, are retracted, by means of said unevenness of the cam plate 76. The unevenness of the cam plate 76 is so designed that immediately after entering the grip region X, the pawls 74 project outwardly and that they are completely retracted before they reach the terminal point of the region X, thereby assuring reliable reception and transfer of barlike pieces a. In FIG. 1, the second trough 11, as in the first trough 2, is so arranged that it can supply and propel barlike pieces therein in a horizontal state to the rotary drum by means of the supply purpose vibration of the second electromagnetic feeder 12.

The second trough 11 is provided at the receiving portion 11" with a base frame 83 which is supported by the resilient plates 84 of the second electromagnetic feeder 12, and the second electromagnetic feeder is installed on the floor surface 13" through spring-equipped mounting blocks 85. The weighing hopper 8 is suspended from the precision correction weighing lever 18 and will be actuated to open and close by means of a contactless proximity switch 87, etc. adjacent the lever 18 at the time to be later described.

Figures 11, 12:
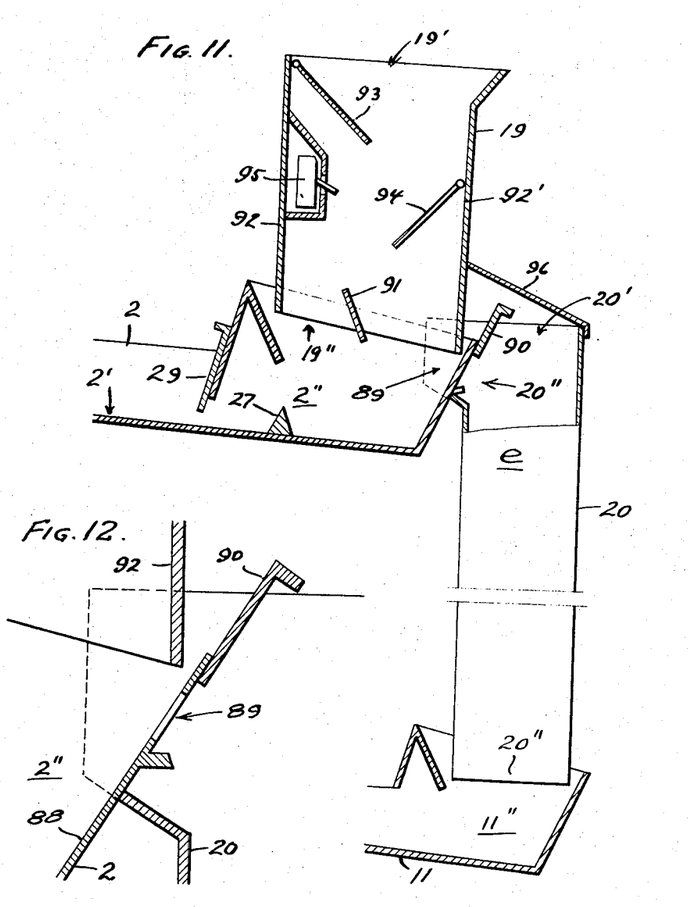
FIG. 11 is an enlarged side elevational view of vertical multistep supply hopper means shown in FIG. 1.
FIG. 12 is an enlarged sectional view of a communication port between the first and second hoppers of the vertical multistep supply hopper means.

As shown in FIG. 11, the vertical multistep supply hopper means e is constituted by the first supply hopper 19 of the first trough 2 and the second supply hopper 20 of the second trough 11. As shown in FIG. 12, the rear plate 88 of the receiving portion 2" of the first trough 2 is bored with a slit 89 through which several barlike pieces can flow out in a horizontal state at a time. A regulator plate 90 for regulating the degree of opening of the slit is provided above the slit 89. The internal structure of the second hopper 20 is such that when once barlike pieces are fed thereto in a horizontal state, they flow down and are discharged in that state. The upper portion of the second hopper 20 is provided with a receiving port 20" projecting therefrom and connected to the outer side of the slit 89. The second hopper 20 is suspended over the receiving portion 11" of the second trough 11, and the open lower end 20" thereof is fitted in the receiving portion 11". The internal structure of the first hopper 19 is also such that when once barlike pieces are fed thereto in a horizontal state, they flow down and are discharged in that state.

The receiving portion 19' of the first trough 19 is opened upwardly and the open lower end 19" thereof is communicatively connected with the receiving portion 2" of the first trough 2. A resistance plate 91 is provided within the first supply hopper 19 at the bottom thereof in such a manner as to form a predetermined angle with the slit 89 so that part of the barlike pieces flowing down onto the first trough 2 may be guided into the slit 89. The front and rear plates 92 and 92' of the first supply hopper 19 are provided with disturbance-correcting plates 93 and 94 in staggered relation, sloping downwardly. An increase and decrease detecting microswitch 95 is provided within the first supply hopper 19. A lid plate 96 is provided at the open upper end portion 20' in such a manner as to be free to open and close. The first and second supply hoppers 19 and 20 are connected together with a necessary clearance so as not to interfere with the vibration of the first and second troughs 2 and 11, and are suitably fixedly supported.

Either manually or by mechanical means such as a bucket conveyor, barlike pieces are horizontally fed in successive necessary quantities into the first supply hopper 19 at the receiving portion 19'. The barlike pieces, while resting on the distrubance-correcting plates 93 and 94 in FIG. 11, flow down in a Z-form by their own weight. Thus they flow down to the open lower end 19" while being prevented from crossing each other.

Further, when the barlike pieces flow out to the receiving portion 2" of the first trough 2, part of them hit against the resistance plate 91, so that they branch into two parts, one falling downwardly to the receiving portion 2" and the other flowing into the slit 89. The barlike pieces in the first supply hopper 1 touch the contacts of the increase and decrease detecting microswitch 95 to actuate the latter. When there are no barlike pieces effective to actuate the switch 95, the latter is rendered inoperative. That is to say, the switch 95 always detects the amount of the barlike pieces reserved in the first supply hopper 19. In accordance with this detection signal, barlike pieces are suitable supplied to the first supply hopper 19, thereby assuring the presence of a fixed amount of barlike pieces therein at any time.

In this condition, if the first electromagnetic feeder 3 is actuated, the barlike pieces that have fallen downwardly onto the bottom plate 2' of the first trough 2 are propelled forwardly in a horizontal state under the action of the vibration of the first electromagnetic feeder 3. The inlet 23 are moved over the parallelism correction plate 29 and under the flow regulator plate 29. Thus, the barlike 4 get over the correction plate 27 by reason of the vibration and the stacking of the barlike pieces, whereby they are moved forwardly while being corrected for parallelism. The regulator plate 29 serves to level off the moving layer of barlike pieces to regulate the amount of flow. When the barlike pieces reach the inlet 23 shown in FIGS. 2 and 3, they flow down onto the receiving portion 4" of the lower trough 4 through the clearance between the roller 24 and the edge 23' owing to their own weight and vibration. Then they are propelled on the bottom plate 4' of the lower trough 4 which is vibrating together with the first trough 2 and, on the way, they are subjected to the same action as described above by the flow regulator plate 30 and parallelism correction plate 28 so that the barlike pieces can be parallelly propelled without crossing each other. When these barlike pieces reach the inlet 23, if the latter is blocked with the preceding barlike pieces they do not flow down into the lower trough 4 but pass over it, it being only when the inlet is open that barlike pieces flow down as described above. At the time of such flowing down, the roller 24 is freely rotated in response to the movement of barlike pieces, thereby guiding them in flowing down. The barlike pieces within the first trough 2 that have just passed over the inlet 23 now get over the parallelism correction plate 27, move down the slope 31 and finally fall downwardly over the front end thereof into the rough-weighing hopper 1.

On the other hand, the barlike pieces within the lower trough 4 also fall downwardly over the front end into the rough-weighing hopper 1. Concurrently with the start of weighing, the large quantity shutter 32 and the weighing completion shutter 34 are opened and the first electromagnetic feeder 3 is operated at its large quantity supply purpose strong vibration, whereby the barlike pieces on the first and lower troughs 2 and 4 are fed into the rough-weighing hopper 1 through their respective outlets at the same time. When the charge amounts to 90—95 percent of the ultimate value, the corresponding displacement of the main lever 15 actuates the contactless proximity switch 35 to change the first electromagnetic feeder 3 from large quantity supply purpose strong vibration to small quantity supply purpose weak vibration. Concurrently, the large quantity shutter 32 is closed to interrupt the supply from the first trough 2. Henceforth the weak vibration serves to accumulate barlike pieces in the accumulation pocket 33. The lower trough 4 that is left open keeps feeding barlike pieces in small quantities into the rough-weighing hopper 1 owing to the weak vibration.

Precision in weighing is thereby increased, and when a predetermined value is reached, the corresponding actuation of the main lever 15 actuates the contactless proximity switch 36 to issue a rough-weighing completion signal, whereby the weighing completion shutter 34 is closed. Concurrently, the bottom 22 of the rough-weighing shutter 34 is opened to discharge the contents into the gauging hopper 5 therebelow. When this discharging operation is completed and the main lever 15 is returned to its original position, the rough-weighing hopper 1 is closed and the large quantity shutter 32 and the weighing completion shutter 34 are reopened and the first electromagnetic feeder 3 is again changed to large quantity supply purpose strong vibration to repeat the above-mentioned operation. At the start of this large quantity supply, the barlike pieces reserved in the accumulation pocket 33 of the first trough 2 are fed in large quantities into the rough-weighing hopper 1 all at once. When the roughly weighed pieces enter the gauging hopper 5, the corresponding displacement of the gauging lever 17 is detected by the contactless proximity switch 43 to detect the excess or deficiency.

In the case of an excessive quantity, the surplus reduction means $c$ and the precision correction means $d$ will be actuated in a manner to be later described. In the case of a deficient quantity, the precision correction means $d$ alone will be actuated for precision correction supply. In case of the ultimate value being attained, the gauging hopper 5, surplus reduction hopper 6 and precision correction supply weighing hopper 8 will be successively opened for direct removal without making reduction in quantity and correction supply weighing. The operation of the surplus reduction means $c$ will first be described. When the excess is gauged by the gauging means $c$, the bottom 42 of the gauging hopper is opened to discharge the contents into the reduction hopper 6 therebelow. The attraction magnet 66 shown in FIG. 4 is then energized and the rotary shaft 56 is rotated in a counterclockwise direction. The energization of the attraction magnet 66 causes the rear end of the lever 62 to be pulled upwardly so that the lever 62 is turned counterclockwise around the axis of the pivot shaft 63. As a result, the vertical lever 64 and horizontal lever 65 are moved downwardly, the control plate 59 is turned counterclockwise around the axis of the pivot shaft 61 and the active plate portion 59' is turned from the position shown in FIG. 6 to the one shown in FIG. 7. Thus the active plate portion 59' takes up part of the barlike pieces within the hopper 6 to bring them to the upper region of the inside of the notched window 48.

In the form shown, during one cycle of the energization of the magnet 66, the rotary shaft 56 is turned counterclockwise through 120°. This angle of turn corresponds to the case of the provision of three buckets 49 equispaced around the peripheral surface of the drum, but in case two buckets are provided, it is turned 180°. The rotation of the rotary shaft 56 rotates a particular bucket 49 on the rotary drum 7 from below and outside the notched window 48 through the notched window 48 by a predetermined amount in a counterclockwise direction. Thereupon, said bucket 49 is turned through a clearance $s$ between the drum 7 and the control plate 59 in its upwardly inclined position and takes up the barlike pieces that are resting in the clearance $s$. The barlike pieces taken up by the control plate 59 are brought into slide contact with the outer peripheral surface 7' of the rotary drum 7 by the upward slope and positively rest on the two opposed lateral plate portions 59" said barlike pieces being thus positively taken up by the bucket 49 passing there. When the rotary drum 7 is rotated by the rotary shaft 56 in the manner described above, the levers 53 are rotated unitarily with the rotary drum 7, performing the following function. Thus, the rollers 54 on the lever 53 are rotated along the cam surface 55' and the levers 53 are rotated against the springs 58 around the axes of the fastener metal members 52. The pawls 51 of the levers 53 project through the slits 50 to the inlets of the buckets 49. After the bucket 49 takes up barlike pieces as described, the pawl 51 projects and holds barlike pieces. The shape of the cam plate 55 is such that the holding continues until the buckets 49 are rotated counterclockwise through a predetermined angle.

After the rotation through a predetermined angle is completed and the barlike pieces reach a predetermined place remote from the hopper 6, the pawl 51 is retracted in accordance with the shape of the cam plate 55 to release the barlike pieces from hold. Concurrently, the bucket 49 lies directed downwardly so that the barlike pieces in the bucket 49 fell downwardly by their own weight. In addition, means may be provided at the place of fall for receiving and feeding barlike pieces to the second trough 11 of the precision correction supply 49. After one bucket 49 takes up barlike pieces, the attraction magnet 66 is deenergized to restore the control plate 59 and linkage to their original positions by means of the stored energy of the spring 67.

Henceforth the operation described above is repeated in accordance with the supply of barlike pieces. Next, the precision correction means $d$ will now be described.

The precision correction means $d$ will be actuated either in case the gauging means $b$ detects a minus error or in case the gauging means $b$ detects a plus error and the surplus reduction means $c$ makes a reduction in quantity to a minus value with respect to the ultimate value. One frame plate 45 of the surplus reduction hopper 6 is opened to discharge the barlike pieces into the weighing hopper 8, whereupon the rotary drum 10 is rotated clockwise as shown in FIG. 10. The second trough 11 feeds barlike pieces in advance toward the surface of the rotary drum in such a manner that they become parallel to the recesses 72 on the peripheral surface of the drum. In this condition, the rotary drum 10 is rotated as described above. Thereupon, the barlike pieces at the front end of the trough 11 are successively received one by one or more in each upwardly opened recess 72. The barlike pieces are carried from the second trough 11 to the chute 9 on the opposite side.

When each recess 72 slightly goes across the barlike piece holding point P in FIG. 10, the lever 75 is turned and the pawl 74 is projected to the inlet of the recess 72. That is to say, the lever 75 is rotated unitarily with the rotary drum 10 and the rear end of the lever 75 is turned along the cam surface 76' of the fixed cam plate 76. When the recess 72 goes across the holding point P, since the diameter of the cam plate 76 is decreased, the lever 75 is turned around the axis of the pivot pin 82 by the pulling force of the spring 77 and the pawl 74 is projected through the opening 73. During the turning in the holding region X, the pawl 74 is maintained in its projected position by the cam plate 76, but when it reaches somewhat short of the releasing point $q$ it is retracted.

The released barlike pieces falls from the now downwardly opened recess 72 downwardly onto the chute 9 and flow down into the weighing hopper 8. As barlike pieces are fed one by one to the hopper 8 by the rotary drum 10, the barlike pieces in the hopper 8 are precisely corrected in weight to provide the ultimate value. Upon completion of the precision correction, the actuation of the contactless proximity switch 87 stops the rotation of the rotary drum 70. The bottom 10 of the hopper 8 is then opened to discharge the correct quantity of barlike pieces to a predetermined place. Upon completion of the discharging operation, the hopper 8 is closed and barlike pieces that have been gauged or reduced in quantity enter the hopper 8, and when a precision correction signal is received, the rotary drum 10 is again operated in the manner described above. The operation of the vertical multistep supply hopper means $e$ will now be described. When barlike pieces fall downwardly onto the resistance plate 91 in FIG. 11, they can pass through the slit 89 by reason of the force of fall and the angle of inclination. Passing through the slit 89, they enter the inlet port 20'' of the second supply hopper 20 and from there they flow down to the open lower end 20'' while suitable guides prevent them from being broken and disturbed. From the open lower end 20'' they flow out horizontally to the receiving portion 11'' of the second trough 11. Thus, part of the barlike pieces flowing along the first trough 2 are fed to the second trough 10 through the second hopper 20. The barlike pieces in the second trough 11 are propelled toward the front end of the second trough 11 by the supply purpose vibration of the second electromagnetic feeder 12. On the way, the parallelism correction plate prevents them from crossing each other and they are fed to the outer peripheral surface 10' of the rotary drum 10.

Various changes and modifications may be made without departing from the scope of the invention or sacrificing the advantages obtainable from the use of the invention, and therefore the invention is not limited to the strict particulars of the embodiments of the invention disclosed herein.

We claim:

1. Apparatus for automatically weighing out material, comprising in combination:
   a. means for automatically feeding and roughly weighing out a portion of the material approximating a predetermined weight, and for then discharging said portion;
   b. gauging means positioned to receive the roughly weighed out portion of material discharged by the means (a) and comprising
      b1. means for signalling the weight relation of said portion to the predetermined weight, and
      b2. means for then discharging said portion;
   c. excess weight reduction means positioned to receive the discharged portion from means (b) and comprising
      c1. means put into operation by the signal from (b) when said signal designates an overweight relation for removing from said portion an amount of material predetermined to adjust said portion to a nonoverweight relation, and
      c2. means for discharging the portion when of nonoverweight relation, and
   d. deficiency-correcting means positioned to receive the nonoverweight portion discharged from means (c) and comprising
      d1. means controlled by an underweight condition thereof for slowly adding material to said underweight portion until said portion attains said predetermined weight, and
      d2. means responsive to a nonunderweight condition of said portion for discharging the same.

2. Apparatus as set forth in claim 1, wherein the means (a) comprises a hopper having an openable bottom through which it discharges said portion, and wherein the gauging means (b) comprises a hopper which receives and gauges the entire portion discharged by the means (a) and which has an openable bottom through which it discharges the so gauged entire portion.

3. Apparatus as set forth in claim 1, and further comprising, in the combination:
   e. vertical multistep gravity feed material supply means positioned to deliver material to be weighed to the means (a) and the means (d1).

4. Apparatus as set forth in claim 1, particularly adapted for weighing material in the form of barlike pieces of a given maximum length, wherein said means (a) comprises
   a1. a rough-weighing hopper of a width to accommodate the length of said pieces;
   a2. vibratory feed trough means having a material supply passage of substantially the same width as said hopper (a1) and positioned to deliver such barlike pieces to said hopper (a1);
   a3. means connected to said feed trough means (a2) for selectively strongly or weakly vibrating the same for selectively supplying a large quantity or a small quantity supply of the barlike pieces therethrough; and
   a4. means responsive to the weight of material in said hopper means (a1) for operating said means (a3) for strongly vibrating said trough means (a2) until such weight attains a given value and for thereafter operating said means (a3) for weakly vibrating said trough.

5. Apparatus as set forth in claim 4, wherein said vibratory feed trough means (a2) comprises upper and lower troughs each having a supply passage of said width, the lower trough being under the upper trough and secured thereto, and the upper trough having an opening in the bottom of its supply passage positioned to deliver barlike pieces therethrough to said lower trough.

6. Apparatus as set forth in claim 1, wherein the excess weight reduction means (c) comprises:
   c3. a hopper which receives the portion discharged by the means (b) and which has a fixed side and an openable side and which has a notched window in its fixed side, and
   c4. a rotary drum journaled outside the hopper (c3) which has buckets equispaced on its outer periphery that have inlets facing in a single direction, and which is located so that the path of rotation of said buckets extends into said hopper (c3) by way of said notched window so that a bucket on rotation through said window to a pickup position in said hopper (c3) can pick up a part of said portion therein for removal from said hopper (c3) to a discharge location.

7. Apparatus as set forth in claim 6, particularly adapted for handling barlike material lying parallel to the fixed side of said hopper (c3), wherein the means (c) further comprises:
 c5. a control plate tiltably mounted inside said window and tiltable outside of the path of rotation of said buckets to an upwardly sloping position or a downwardly sloping position, said plate (c5) having an extension from the lower side of its free end which swings through said window and prevents the barlike material from entering the path of rotation of said buckets below said control plate (c5).

8. Apparatus as set forth in claim 7, wherein said apparatus comprises:
 c6. a fixed cam in said means said (c4) adjacent
 c7. slits in the outer periphery of said drum (c4) adjacent to the inlets to said buckets,
 c8. pawls positioned inwardly of said drum (c4) at said slits (c7), and
 c9. levers operatively connected to said pawls (c8) and to said cam (c6);
said levers (c9) and cam (c6) being formed to advance said pawls (c8) through said slits (c7) to close the inlets to said buckets for retaining therein material picked up thereby during rotation of said buckets to said discharge location, and to hold said pawls (c8) retracted when said buckets are at said discharge location and said pickup location.

9. Apparatus as set forth in claim 7, said control plate (c5) being provided with an actuating means comprising an attraction magnet outside said hopper (c3) which is actuated to tilt said control plate upwardly during the time of rotation of said rotary drum.

10. Apparatus as set forth in claim 9, wherein said deficiency correcting means (d) comprises:
 d3. a weighing hopper positioned to receive the barlike pieces in parallel arrangement as discharged from the means (c) and of the width to accommodate the lengths of said pieces,
and in which said means (d1) comprises:
 d4. a second vibratory feed trough having a material supply passage of a width to accommodate the lengths of said pieces, and
 d5. a rotary drum mounted between the front end of said vibratory feed trough (d4) and the upper part of said weighing hopper (d3) in a position such that the barlike pieces fed to the front end of said second trough (d4) are caught by the outer peripheral surface of said rotary drum (d5), and having
 d6. equispaced barlike piece-receiving recesses positioned to present mouths opening upwardly at said pickup location and downwardly after rotation to said discharge location, thus to deliver such pieces to the weighing hopper (d3) in small successive quantities as said drum (d5) is rotated.

11. Apparatus as set forth in claim 10, wherein said apparatus comprises:
 d7. a fixed cam in said means (d),
 d8. slits in the outer periphery of said drum (d5) adjacent to the mouths of the recesses (d6) therein,
 d9. pawls positioned inwardly of said drum (d5) at said slits (d8), and
 d10. levers operatively connected to said pawls (d8) and said fixed cam (d7),
said levers (d10) and cam (d7) being formed to advance said pawls (d9) through said slits (d8) to close the mouths of said recesses (d6 for retaining therein material picked up thereby during rotation of said recesses to said discharge location, and to hold said pawls (d9) retracted when said recesses are at said discharge location and said pickup location.

12. Apparatus as set forth in claim 10, and further comprising in the combination:
 e. vertical multistep gravity feed material supply means comprising:
  e1. a first supply hopper having a bottom opening delivering to a rearward portion of said vibratory feed trough means (a2), and
  e2. a second supply hopper having a bottom opening delivering to a rearward portion of said second trough (d4) said second supply hopper (e2) having an upper receiving end proximate to the lower rear portion of said first supply hopper (e1),
said first trough means (a2) being provided with a delivery slot at the rear part of its receiving position through which the material in barlike pieces may be delivered, and which communicates with the upper receiving end of said second supply hopper (e2), and an angularly disposed resistance plate positioned at the lower portion of said first hopper in opposed relation to said delivery slot.